United States Patent [19]

Wilson

[11] 4,070,028

[45] Jan. 24, 1978

[54] CLEANSING OF CONTAMINANTS FROM GRAMOPHONE RECORDS

[75] Inventor: Percy Wilson, Oxford, England

[73] Assignee: Metrosound Audio Products Ltd., England

[21] Appl. No.: 700,986

[22] Filed: June 29, 1976

Related U.S. Application Data

[63] Continuation of Ser. No. 327,396, Jan. 29, 1973, abandoned.

[30] Foreign Application Priority Data

Mar. 29, 1972 United Kingdom .............. 14750/72

[51] Int. Cl.$^2$ .............................................. G11B 3/58
[52] U.S. Cl. .................................. 274/47; 15/104.92
[58] Field of Search ......................... 15/256.5, 104.92; 274/47

[56] References Cited

U.S. PATENT DOCUMENTS

| 1,249,720 | 12/1917 | Christian | 274/47 |
|---|---|---|---|
| 1,256,099 | 12/1918 | Baker | 274/47 |
| 1,442,680 | 1/1923 | Borst et al. | 274/47 |
| 2,773,692 | 12/1956 | Dunnavan | 274/47 |
| 3,486,757 | 12/1969 | Loescher | 274/47 |
| 3,572,725 | 3/1971 | Murphy | 274/47 |

FOREIGN PATENT DOCUMENTS 13,077 of 1904 United Kingdom .................. 274/47

*Primary Examiner*—Daniel Blum
*Attorney, Agent, or Firm*—William Anthony Drucker

[57] ABSTRACT

A cleaning device, for the removal of contaminants from the grooves of gramophone records, is of the kind having a rod-like scouring element adapted to pass down into the groove at least partially towards the base of the groove, a reservoir for supplying cleansing liquid to the scouring element, and means for supporting the scouring element in relation to a rotating record, the scouring element being resiliently bendable and/or the supporting means providing resilient support of the scouring element. A supporting means is so arranged that the longitudinal axis of the scouring element may lie in a plane which is substantially normal to the groove radius at the point of contact, and with the longitudinal axis of the scouring element forming less than a right angle, preferably within the range 30° to 45° and most preferably approximately 35°, with the plane of the record downstream of the point of contact, i.e. such that the scouring element is presented in opposition to the direction of relative movement of the record.

5 Claims, 5 Drawing Figures

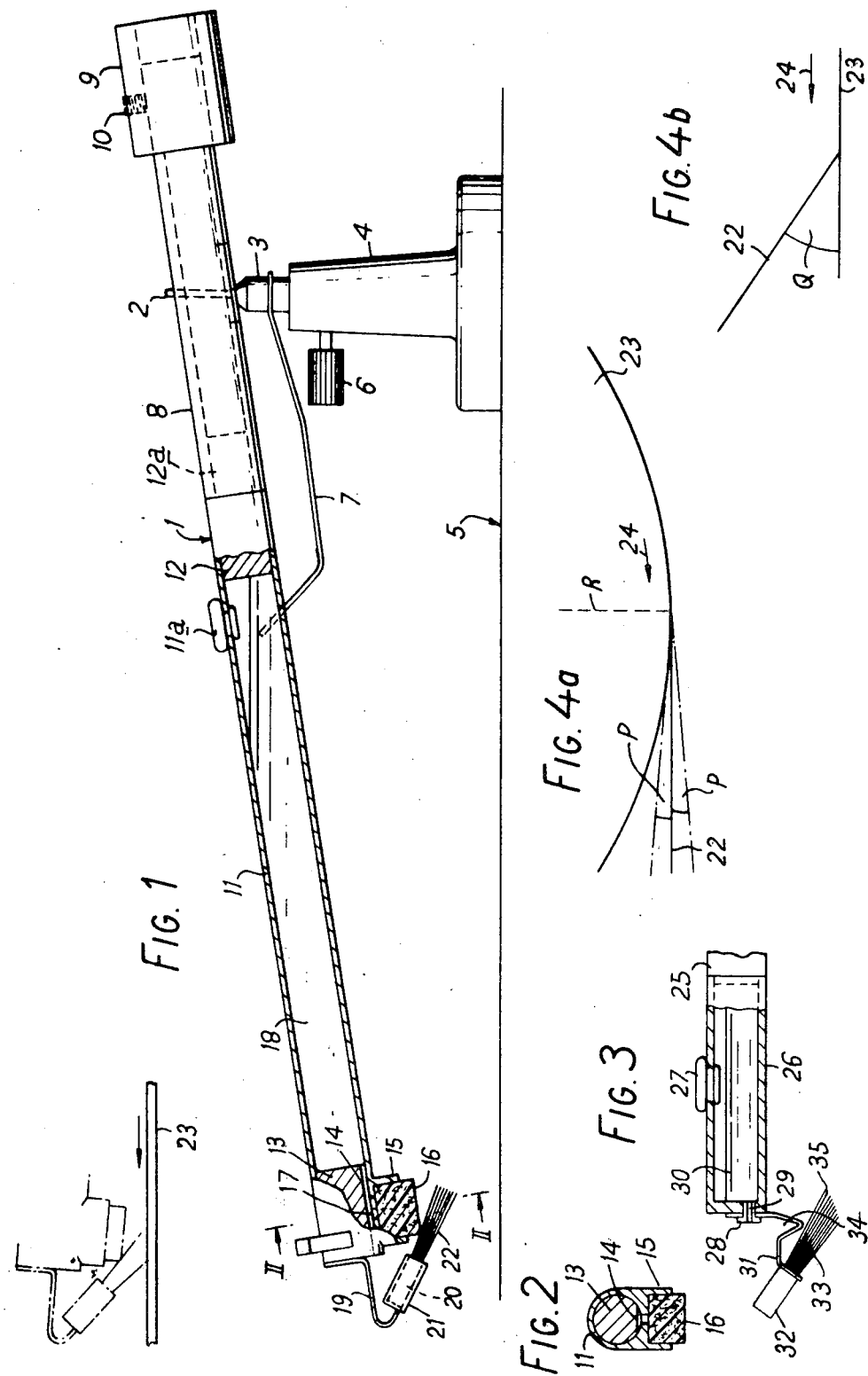

CLEANSING OF CONTAMINANTS FROM GRAMOPHONE RECORDS

This is a continuation of application Ser. No. 327,396, filed Jan. 29, 1973, now abandoned.

This invention relates to the cleaning of contaminants from gramophone records.

Both whilst being played and whilst being stored, gramophone records are liable to receive in their grooves contaminants such as minute particles of smog, household sprays, and tobacco smoke. They are also liable to pick up grease and other contaminants as a result of being handled between the fingers and thumb. The significant characteristics of these contaminants is that they gradually become sticky, and harden, and thereby entrap and seal any deposit of dust or grit, even within the grooves themselves.

The object of the present invention is to provide means for the progressive removal of such contaminants, plus any trapped grit deposits, during rotation of the record, e.g. during playing.

According to the present invention a cleaning device for the removal of contaminants from the grooves of a gramophone record comprises a rod-like scouring element adapted to pass down into the groove at least partially towards the base of the groove, a reservoir for supplying cleansing liquid to the scouring element, and means for supporting the scouring element in relation to a rotated record, the scouring element being resiliently bendable and/or the supporting means providing resilient support of the scouring element, the supporting means being arranged so that the longitudinal axis of the scouring element may lie in a plane which is substantially normal to the groove radius at the point of contact, and the longitudinal axis of the scouring element forming less than a right angle with the plane of the record downstream of the point of contact.

The angle which the axis of the scouring element forms with the plane of the record is advantageously in the range 20° to 60°, and preferably 30°–45°, and most preferably 35°.

The scouring element may advantageously pass completely down into the groove so as to contact the base of the groove. For example, the end portion of the element may be shaped to conform to the side walls of the groove, and so as to contact both side walls or so as to be spaced therefrom.

A plurality of scouring elements are preferably provided, so as to engage simultaneously with the record, e.g. into the same groove, and/or into two or more adjacent grooves, whereby each groove is subjected to a plurality of scouring actions.

In a preferred arrangement, the scouring element is a bristle, e.g. of nylon or other synthetic resinous plastics material, and a plurality of such bristles may be mounted in a brush-like formation, preferably with its face which is presented towards the record shaped appropriately at an angle to facilitate entry of the bristles into a groove.

The engagement of the scouring element, or a plurality of elements, into the groove or grooves may serve to cause the cleaning device to track across the record as it rotates. Alternatively, there may be provided a separate shifting means for tracking the cleaning device across the record, and such shifting means may be constituted by a member coupled mechanically to the cleaning device and engaging grooves of the record so as to track across the record.

The reservoir for supply of cleansing liquid may be constituted by the scouring element itself, e.g. a single element or a bunch of elements adapted to hold liquid by surface tension effect, or there may be provided a receptacle to hold the liquid, and means defining a flow path from the receptacle to the scouring element. Preferably, there is controlled flow by capillary attraction, and/or by valve means which may be manually adjusted.

In order that the nature of the invention may be readily ascertained, two embodiments of cleaning device in accordance therwith are hereinafter particularly described with reference to the accompanying drawing, wherein:

FIG. 1 is a side elevation, with parts shown in axial vertical section, of a first embodiment and including a separate showing, in dotted line, of a scouring element contacting a record;

FIG. 2 is a transverse section taken on the line II—II of FIG. 1;

FIG. 3 is a side elevation, with part shown in axial vertical section, of a second embodiment.

FIG. 4a shows diagrammatically a plan view of the record and scouring element.

FIG. 4b shows diagrammatically a side elevation corresponding to FIG. 1;

Referring to FIGS. 1 and 2, the cleaning device comprises an arm 1 which is supported rotatably on a vertical pivot rod 2 carried by a stem 3 secured in a pick-up arm mounting 4 on a deck 5 of a record player. The stem 3 can be adjusted axially for height in the mounting 4, and can be secured by a knurled screw 6. A spring-wire rest 7 is adapted to support the arm 1 in the lowered non-use position. The hole in the arm 1 in which the pivot rod 2 is engaged is slotted at its lower end, so that the arm 1 can be raised from the rest 7, then moved laterally over the record.

The arm 1 comprises a stem tube 8 on which a counterweight 9 can be adjusted and tightened by a screw 10. A reservoir tube 11, with removable closure 11a, is sealed at one end by a plug 12 which engages at 12a releasably into the end of stem tube 8. The other end of tube 11 is closed by a plug 13 having a chordal flat cut away on it to provide a capillary channel 14. At the underside of tube 11 there is an annular flange 15 in which is secured a block 16 of polyurethane foam. An opening 17 completes a flow path for liquid 18 from the reservoir tube 11, through the passage 14 to the block 16.

On the end of tube 11 there is secured a resilient mounting 19, which may be a metal or plastics blade, carrying a head 20 secured by a rubber sleeve 21. In the head 20 there are secured a rod-like bunch of nylon bristles 22 which contact the block 16 so as to receive a slow feed of liquid. The bristles are resiliently bendable transversely to the longitudinal axis of said bunch.

A gramophone record 23, mounted on a turntable (not shown) is rotated in the direction of the arrow 24. Referring to the portion of FIG. 1 shown in chain-dotted lines, the cleaning device is seen in its working position in which the tips of the bristles 22 engage into several grooves of the record, with the bristles lying so as to tend to oppose the rotation of the record.

The bearing of the arm on the pivot rod 2, which permits both its tracking movement and its raising and lowering movement, is preferably somewhat below the plane of the record 23. This is to ensure the torque created by the friction occurring between the groove and the securing element will be such that an increase of friction, due to contaminants or exceptional groove conditions, will increase the force with which the scouring element is urged into the groove, and thereby increase its scouring effect.

Referring to FIG. 3, the arm 25 incorporates a reservoir tube 26 with a removable closure 27. The end wall of the tube 26 carries a plug or screw 28 having an axial capillary passage 29 to permit flow of liquid 30 onto a resilient mounting 31 carrying a head 32 with a plurality of bristles 33. The liquid flows into a trough 34, and out of the ends of the trough onto the bristles. The face of the bunch of bristles is cut away on the slant, as seen at 35 so that when the device is resting on a rotating record, the ends of all of the bristles can readily engage into adjacent grooves.

With both of the embodiments described above, the device tracks across the record as a result of engagement of the bristles in the grooves.

As the record rotates, with the ends of the bristles engaged in the grooves, the liquid cleansing agent loosens and softens hardened contaminants lying trapped in the groove and pitted into the walls and base of the groove. The scouring elements remove the softened contaminants and these are retained on the bristles by their own stickiness and the surface tension of the liquid, with which they form a sludge. As more contaminant is removed, it piles up on the bristles and gradually moves back up the bristles, so that clean bristle ends are always present to the groove.

A suitable cleaning liquid, which also has a lubricating effect, is an aqueous solution of isopropyl alcohol.

Referring to FIGS. 4a and 4b, the longitudinal axis of the element 22 lies at an angle "Q" with respect to the plane of the record 23, and can be either tangential to the record 23, at the point of contact at the end of radius "R", or at a small angle "P", of a few degrees, offset at either side of the tangent to radius "R".

I claim:

1. A cleaning device, for use on a record player including a deck and a turntable, for the removal of contaminants from the grooves of a micro-groove gramophone record carried on said turntable, comprising:
  i. a mounting for disposition on said deck, said mounting including pivot means
  ii. an arm supported adjacent one of its ends on said pivot means and pivotable thereon for lateral movement of its other end with respect to the deck and for lifting and lowering movement of its other end with respect to the deck,
  iii. supporting means on the other end of said arm
  iv. a rod-like bunch of bristles constituting a scouring element and having a longitudinal axis and a first end and a second end, said bunch of bristles being resiliently bendable transversely to said axis, said bunch of bristles being secured by its first end to said supported means, said bunch of bristles having its second end extending away from the supporting means with its axis having a first component of direction away from said arm and a second component of direction towards said mounting such that said bunch of bristles lies, when the device is in use on the gramophone record, at an angle within the range 20° through 60° with respect to the plane of the gramophone record and extends in the direction against the rotation of the gramophone record, said second end of said bunch of bristles being adapted to pass down into the groove of the gramophone record at least partially towards the base of said groove,
  v. a receptacle for supplying cleansing liquid to said bunch of bristles,
  vi. means defining a flow path for said liquid from said receptacle to said bunch of bristles, and
  vii. said mounting having a lower end for placing on said deck, and an upper end at which said pivot means is disposed, said arm being positioned when the bunch of bristles is in use on a gramophone record, at an inclination upwardly from said one end thereof towards said other end thereof, whereby an increase of drag resistance occurring between the bunch of bristles and the record surface results in an increase of force urging the bunch of bristles down into the groove of the record.

2. A cleaning device, as claimed in claim 1, wherein said means defining a flow path for said liquid from said receptacle to said bunch of bristles include means providing a capillary action for constant metered flow of liquid to said bunch of bristles.

3. A cleaning device, as claimed in claim 1, having in said receptacle a readily evaporatable liquid.

4. A cleaning device, as claimed in claim 1, wherein said angle is about 35°.

5. A cleaning device, as claimed in claim 1, wherein said bunch of bristles has said second end shaped at an oblique angle to facilitate entry of the bristles into said groove.

* * * * *